United States Patent [19]

Gillessen et al.

[11] 3,883,498

[45] May 13, 1975

[54] [ILE³, LEU⁴]-VASOPRESSIN ANALOGS

[75] Inventors: Dieter Gillessen, Birsfelden; Josef Rudinger, Zurich; Rolf Studer, Bottmingen, all of Switzerland

[73] Assignee: Hoffmann-La Roche Inc., Nutley, N.J.

[22] Filed: Sept. 7, 1973

[21] Appl. No.: 395,105

[30] Foreign Application Priority Data
Sept. 21, 1972 Switzerland.................. 13083/72

[52] U.S. Cl............................. 260/112.5; 424/177
[51] Int. Cl.. C07c 103/52; C07g 7/00; A61k 27/00
[58] Field of Search.................. 260/112.5; 424/177

[56] References Cited
OTHER PUBLICATIONS

Sawyer, et al., Ann. Rev. Pharmacol., 13, 5–17, (1973).

Berde, B. and Boissonnas, R. A., "Handbook of Experimental Pharmacology," Vol. 23, Eichler, et al., eds., Springer-Verlag, Berlin, (1968), pp. 850-2, 862.

*Primary Examiner*—Lewis Gotts
*Assistant Examiner*—Reginald J. Suyat
*Attorney, Agent, or Firm*—Samuel L. Welt; Jon S. Saxe; George M. Gould

[57] ABSTRACT

Analogs of the hormone vasopressin are described. These new hormones, X-[Ile³,Leu⁴]-argininevasopressin and X-[Ile³,Leu⁴]-lysinevasopressin exhibit particularly strong natriuretic activity.

13 Claims, No Drawings

[ILE³, LEU⁴]-VASOPRESSIN ANALOGS

DESCRIPTION OF THE INVENTION

The present invention is concerned with novel peptides and a process for the preparation thereof.

The polypeptides provided by the present invention are compounds of the general formula

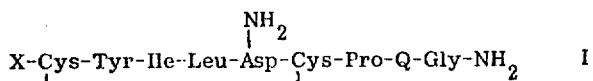

$$\text{X-Cys-Tyr-Ile-Leu-Asp-Cys-Pro-Q-Gly-NH}_2 \quad \text{I}$$

wherein X is the residue of an amino acid or of a linear peptide of 2–6 amino acids and Q is the residue of arginine or lysine and wherein all amino acids with an asymmetric center have the L-configuration and their pharmaceutically acceptable, non-toxic acid addition salts.

The compounds of formula I, which can also be represented by the formulae

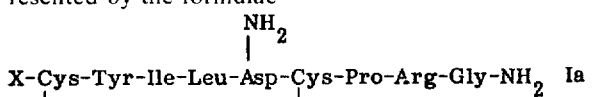

$$\text{X-Cys-Tyr-Ile-Leu-Asp-Cys-Pro-Arg-Gly-NH}_2 \quad \text{Ia}$$

and

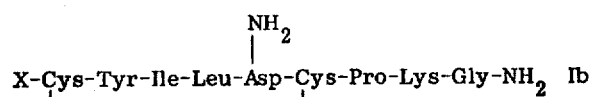

$$\text{X-Cys-Tyr-Ile-Leu-Asp-Cys-Pro-Lys-Gly-NH}_2 \quad \text{Ib}$$

wherein X is as above are related to derivatives of analogs of the naturally occurring neurohypophysis-hormones; for example, the arginine- or lysinevasopressins of the formulae

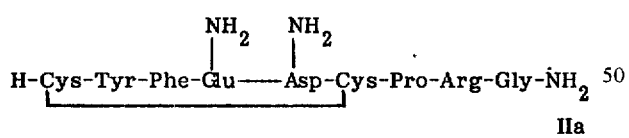

and

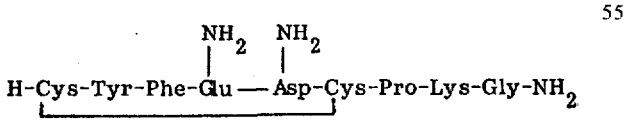

The compounds provided by the present invention differ from the naturally occurring vasopressins on the one hand by the replacement of the amino acids phenylalanine and glutamine by isoleucine and leucine, respectively, and, on the other hand, by having an additional amino acid residue or linear peptide residue X. They can thus be denoted, in an abbreviated form as X-[Ile³,Leu⁴]-argininevasopressin and X-[Ile³,Leu⁴]-lysinevasopressin, respectively.

The abbreviations used in the present specification for the individual amino acids and their protecting groups are those hitherto customarily used in peptide chemistry and generally known to the person skilled in the art (Literature: Schroder, E. and Lubke, K.: The Peptides, Academic Press, New York and London, Vol. I (1965) and Vol. II (1966) and IUPAC-IUB-Rules). No further definition of such abbreviations is therefore given in this specification.

Unless expressly stated otherwise the optically active amino acids always have the L-configuration.

Examples of amino acid residues denoted by X in formula I are acyl residues derived from α-aminocarboxylic acids, especially those which are naturally occurring. Such α-aminocarboxylic acids may be neutral, basic or acidic as well as aliphatic, aromatic or heterocyclic; for example, alanine, valine, leucine, isoleucine, serine, threonine, methionine, cysteine, lysine, arginine, asparagine, glutamine, aspartic acid, glutamic acid, phenylalanine, tyrosine, proline, hydroxyproline, histidine and tryptophan. Linear peptide residues of 2—6 amino acids represented by X in formula I are obtained by peptide-type bonding, for example, of the aforementioned amino acids.

Examples of pharmaceutically acceptable, non-toxic acid addition salts are salts formed with inorganic acids such as hydrochloric acid, hydrobromic acid, phosphoric acid, sulfuric acid and perchloric acid or with organic acids such as acetic acid, oxalic acid, maleic acid, malic acid, tartaric acid or citric acid.

According to the process provided by the present invention, the polypeptides aforesaid (i.e., the compounds of formula I and their pharmaceutically acceptable, non-toxic acid addition salts) are prepared by a. cleaving off the protecting group(s) from a peptide of the general formula

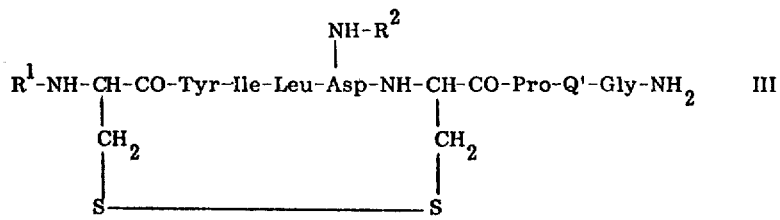

wherein R¹ is the optionally protected residue of an amino acid or of a linear peptide of 2–6 amino acids;
R² is a hydrogen atom or an amide protecting group;
Q' is a grouping of the formula

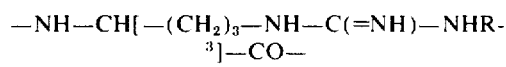

or

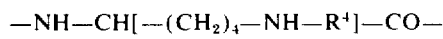

in which R³ is hydrogen or a group protecting the guanidine residue and R⁴ is hydrogen or an amino protecting group protecting the lysine residue, provided that at least one of R¹, R², and R³ or R⁴ represents or contains a protecting group and, if desired, converting the free peptide obtained into a pharmaceutically acceptable, non-toxic acid addition salt by reaction with an organic or inorganic acid, or b. oxidizing a peptide of the general formula

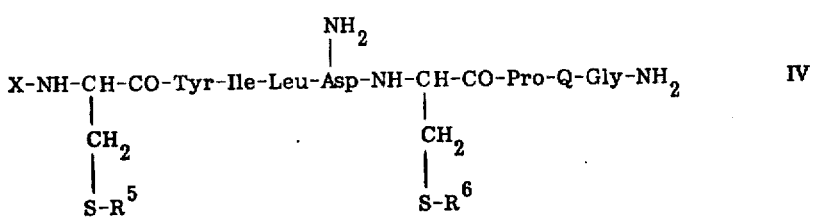

wherein X and Q are as above and $R^5$ and $R^6$ each are hydrogen or a sulphydryl protecting group with simultaneous or prior cleavage of protecting groups which may be present and, if desired, converting the product obtained into a pharmaceutically acceptable, non-toxic acid addition salt by reaction with an organic or inorganic acid, or c. oxidizing a peptide of the general formula

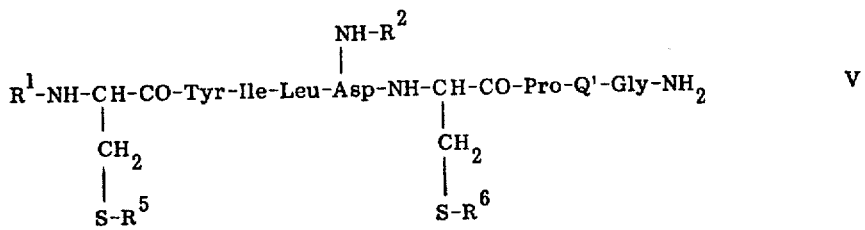

wherein $R^1$, $R^2$, $Q'$, $R^5$ and $R^6$ are as above with simultaneous cleavage of the protecting group(s) and, if desired, converting the product obtained into a pharmaceutically acceptable non-toxic acid addition salt by reaction with an organic or inorganic acid.

The oxidation of a peptide of formula IV or V can be carried out in a known manner (see, for example, Schroder-Lubke, Vol. I, page 275 et seq.). It is preferably carried out in an aqueous or aqueous/organic solution by the introduction of air or oxygen or by means of hydrogen peroxide, iodine, 1,2-diiodoethane or potassium ferricyanide. Sulphydryl protecting groups which may be present can be removed simultaneously with or prior to the oxidation. The oxidation of a peptide of formula IV in which $R^5$ and $R^6$ both are hydrogen, trityl, benzhydryl, acetamidomethyl, benzylthiomethyl or isobutyloxymethyl can be carried out, for example, with dirhodane [(SCN)$_2$] and the oxidation of a peptide of formula IV in which $R^5$ and $R^6$ both are hydrogen, trityl or acetamidomethyl can be carried out, for example, with iodine.

The cleavage of protecting groups from a peptide of formula III or V can also be carried out in a generally known manner and under the conditions applicable to the individual groups.

The protecting groups referred to in this specification can be any of the protecting groups known n peptide chemistry.

Examples of amino protecting groups are those of the acyl type (e.g., formyl, benzoyl, phthalyl, trifluoroacetyl, p-tosyl, aryl- and alkylphosphoryl, phenyl- and benzylsulphonyl, tritylsulphenyl, o-nitrophenylsulphenyl, γ-chlorobutyryl and o-nitrophenoxyacetyl), of the alkyl type (e.g., trityl, benzyl and alkylidene) or of the urethane type (e.g., carbobenzoxy, p-bromo-, p-chloro- or p-methoxycarbobenzoxy, tolyloxy-, allyloxy-, cyclopentyloxy-, cyclohexyloxy-, t-butyloxy- or 1,1-dimethylpropyloxy-, 2-(p-biphenylyl)-2-propyloxycarbonyl and benzylthiocarbonyl). In addition, amino groups can be protected by protonation. Examples of amide protecting groups are xanthenyl, 2,4-dimethoxybenzyl, 2,4,6-trimethoxybenzyl and 4,4'-dimethoxybenzhydryl.

Special protecting groups for the arginine residue include, for example, p-tosyl, carbobenzoxy, p-nitrocarbobenzoxy, tertbutoxy-, adamantyloxy- or isobornyloxycarbonyl. The arginine residue can also be protected by protonation or nitration.

Examples of sulphydryl protecting groups are alkylthio and arylthio groups such as ethylthio, tertbutylthio and phenylthio, alkyl and substituted-alkyl groups such as tertbutyl, 2-diethoxycarbonyl-ethyl, benzyl, trityl, p-methoxybenzyl, p-nitrobenzyl, benzylthiomethyl, acetamidomethyl, and isobutyloxymethyl, acyl groups such as carbobenzoxy, benzoyl, acetyl, p-methoxy-benzyloxycarbonyl and ethylaminocarbonyl or tetrahydropyran-2-yl.

The starting materials of formulae III, IV and V are novel and it will be appreciated that they form part of the present invention.

The starting materials can be prepared in a manner known per se using the usual protecting groups, especially those mentioned earlier.

Examples of carboxyl protecting groups are O- and S-esters (e.g., the methyl, ethyl, tertbutyl, benzyl, cyanomethyl, phthalimidomethyl, 4-picolyl, 2-p-tosylethyl, phenyl, p-nitrophenyl, thiophenyl and p-nitrobenzyl esters), amides and hydrazides (e.g., the trityl, phenyl, carbobenzoxy and tertbutoxycarbonyl hydrazides). In addition, the carboxyl group can be protected by salt formation.

Examples of activated carboxyl groups are esters such as the cyanomethyl, p-cyanophenyl, p-nitrophenyl, thiophenyl, p-nitrothiophenyl, 1-benztriazolyl, 1-succinimidyl, 1-piperidyl, 8-quinolyl, 5-chloro-8-quinolyl, 2-pyridyl and 2-thiopyridyl esters and azides.

A peptide starting material of formula IV or V can be prepared, for example, by the successive chain-lengthening of a dipeptide with an amino acid unit or from two or more basic units. A peptide of formula V can be converted into a peptide of formula III by oxidation in a manner known per se. A peptide of formula III can, however, also be prepared, for example, by reacting a compound of the general formula

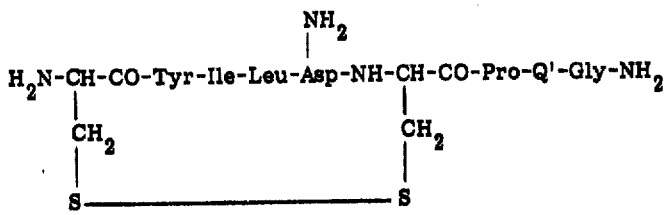

wherein Q' is as above with a protected amino acid or a protected linear peptide of 2–6 amino acids and subsequently cleaving off the protecting groups.

The polypeptides of formula I provided by this invention possess hormonal activity qualitatively similar to that of the neurohypophysial-hormones. The strong natriuretic activity is especially prominent. They are superior, not only with regard to the strength of action but also with regard to the duration of action, to natural argininevasotocin { [Ile³] -argininevasopressin } and to [Leu⁴] -oxytocin prepared by V. J. Hruby et al. (J. Biol. Chem. 244, 3890, 1969) which is a neurohypophysial-hormone analog which has hitherto the strongest known natriuretic activity. The hypertensive activity of the present polypeptides is less than that of argininevastotocins the natriuretic activity of the present polypeptides being selectively increased with respect to the hypertensive activity. A further advantage of the polypeptides of the present invention as compared with, for example, argininevasotocin and [Leu⁴] -oxytocin, lies in the fact that the sodium excretion is selectively strongly increased with respect to the potassium excretion.

Finally, as compared with the aforementioned compounds and with compounds of the general formula

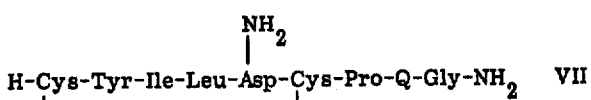

wherein Q is as above
the polypeptides provided by the present invention are distinguished by having protracted action, Gly- [Ile³,Leu⁴] -lysinevasopressin and Gly- ]Ile³,Leu⁴] -argininevasopressin having an especially good action.

Gly- [Ile³,Leu⁴] -argininevasopressin diacetate has a TRF$_{Na}$ (Tubular Rejections Fraction of sodium according to Cort et al., A. J. of Physiol, 215 (1968) 921) in the cat of 7.5 percent at 20 μg/kg and a half-life of the duration of action of 140 minutes. Leu-Gly- [Ile³,Leu⁴] -lysinevasopressin diacetate and Leu-Gly-Gly- [Ile³,-Leu⁴] -argininevasopressin triacetate each have a TRF$_{Na}$ in the cat of 3 percent at 50 μg/kg.

On the basis of the aforementioned biological activities, the present polypeptides are suitable for the treatment of oedemas of various types and of general disorders of the electrolyte exchange, especially those of sodium retention.

The dosage of the present polypeptides should be regulated according to the individual requirements and can vary between 100 μg to 10 mg. per single dose which may be administered one or more times per day.

The present polypeptides can be administered in the form of free bases or as pharmaceutically acceptable, non-toxic salts with organic or inorganic acids or with polymers containing acid groups (e.g., carboxymethylcellulose or tannic acid). The polypeptides may be administered alone or in the form of pharmaceutical preparations suitable, for example, for oral, parenteral, enteral or intranasal administration. For the production of pharmaceutical preparations, the polypeptides can be compounded with inorganic or organic substances which are inert and physiologically acceptable.

Examples of such adjuvants are:

for tablets: lactose, starch, talc and stearic acid;

for injection solutions: water, alcohols, glycerin and vegetable oils;

for suppositories: natural and hydrogenated oils and waxes;

for intranasal spray solutions: water, glycerin and other liquid substances which are tolerated by the mucous membrane.

The pharmaceutical preparations can also contain, for example, suitable preservatives, stabilizers and wetting agents as well as sweetening, coloring and flavoring materials.

It will accordingly be appreciated that the invention includes within its scope a pharmaceutical preparation containing a polypeptide as hereinbefore defined in association with a compatible pharmaceutical carrier.

The following examples illustrate the process provided by the present invention.

EXAMPLE 1 a.

Z-L-Leucyl-L-asparaginyl-S-benzyl-L-cysteinyl-L-prolyl-N$^G$-tosyl-L-arginyl-glycinamide.

18.0 g of Z-L-asparaginyl-S-benzyl-L-cysteinyl-L-prolyl-N$^G$-tosyl-L-arginyl-glycinamide [prepared according to R. L. Huguenin and R. A. Boissonnas, Helv. 49, 695 (1966)] were dissolved in 100 ml of glacial acetic acid and mixed with 100 ml of a 5 N hydrogen bromide/glacial acetic acid solution. The mixture was stirred for 45 minutes at room temperature and subsequently added dropwise into 1 litre of ether. The precipitated hydrobromide of the pentapeptide was washed with ether, dried over potassium hydroxide and phosphorus pentoxide and dissolved in 100 ml of methanol. The solution was passed through a column of Dowex 2 (OH⁻ form), the eluate concentrated under reduced pressure and the residue dissolved in 100 ml of dimethylformamide. The solution was mixed at 0°C with 8.5 g of Z-L-Leu-OPhNO₂, the mixture stored for 3 days at room temperature and the protected hexapeptide precipitated by the addition of 1 litre of ethyl acetate, washed with ether and ethyl acetate and dried. Yield : 16.3 g; melting point 183°–185°C; [α]$_D^{25}$ = −41.6° (c = 0.5 in dimethylformamide).

b.

Z-L-Isoleucyl-L-leucyl-L-asparaginyl-S-benzyl-L-cysteinyl-L-prolyl-N$^G$-tosyl-L-arginyl-glycinamide.

The Z-protecting group was cleaved off from 16.0 g of Z-L-leucyl-L-asparaginyl-S-benzyl-L-cysteinyl-L-prolyl-N$^G$-tosyl-L-arginyl-glycinamide in the manner described in part (a) and the free amine obtained was reacted with 6.0 g of Z-L-Ile-OPhNO₂ in 100 ml of dimethylformamide. The mixture was stored for 2 days at room temperature, the protected heptapeptide precipitated by the addition of 1 litre of ethyl acetate and the precipitate washed with ether, ethyl acetate and isopropanol and dried. Yield: 13.1 g; melting point 211°–212°C; $[\alpha]_D^{25} = -41.9°$ (c = 0.5 in dimethylformamide).

c. Z-Glycyl-S-benzyl-L-cysteinyl-L-tyrosyl-L-isoleucy-L-leucyl-L-asparaginyl-S-benzyl-L-cysteinyl-L-prolyl-N$^G$-tosyl-L-arginyl-glycinamide.

A solution of 0.44 g of Z-glycyl-S-benzyl-L-cysteinyl-L-tyrosine hydrazide [prepared according to K. Jost et. al., Collection Czech. Chem. Commun. 26, 2496 (1961)] in 5 ml of dimethylformamide was mixed at −20°C with 2 ml of 2.5 N hydrochloric acid in tetrahydrofuran and 0.2 ml of isoamyl nitrite. The mixture was stirred for 30 minutes at −20°C, cooled to −30 °C, mixed at this temperature, after neutralisation with 0.56 ml of N-methylmorpholine, with a solution of 0.76 g of L-isoleucyl-L-leucyl-L-asparaginyl-S-benzyl-L-cysteinyl-L-prolyl-N$^G$-tosyl-L-arginyl-glycinamide [obtained by cleavage of the benzyloxycarbonyl residue from Z-L-isoleucyl-L-leucyl-L-asparaginyl-S-benzyl-L-cysteinyl-L-prolyl-N$^G$-tosyl-L-arginyl-glycinamide in the manner described in part (a)] in 8 ml of dimethylformamide and stored for 3 days at 4°C. The protected decapeptide was precipitated by the addition of ethyl acetate, filtered, washed with ethyl acetate and ether, dried, dissolved again in dimethylformamide and precipitated again by the dropwise addition into a mixture of ethanol/water (1:1), filtered and dried. Yield: 0.8 g; melting point 238°–241°C; $[\alpha]_D^{25} = -35.3°$ (c = 0.5 in dimethylformamide).

d. Gly-[Ile$^3$, Leu$^4$]-argininevasopressin diacetate 400 mg of Z-glycyl-S-benzyl-L-cysteinyl-L-tyrosyl-L-soleucyl-L-leucyl-L-asparaginyl-S-benzyl-L-cysteinyl-L-prolyl-N$^G$-tosyl-L-arginyl-glycinamide in 500 ml of liquid ammonia were reduced with sodium. After removal of the ammonia, the residue was dissolved in 800 ml of 0.2 N acetic acid and the solution adjusted to pH 7.4 with sodium hydroxide. Thereupon, 60 ml of a 0.01 M potassium ferricyanide solution were added, the pH being kept at 6.8–7.4 by the addition of sodium hydroxide. The mixture was stored for 15 hours at 4°C and passed through a column of Amberlite IR-45 (Cl$^-$ form). The eluate was acidified with acetic acid and adsorbed on Amberlite CG-50 (H$^+$form). After washing with 500 ml of 0.2 percent acetic acid, the mixture was eluted with a mixture of pyridine/glacial acetic acid/water (30:4:66) and the eluate lyophilised twice with intermediate uptake with water. For further purification, the lyophilisate was dissolved in 3 ml of a 0.5 M ammonium acetate buffer (pH = 6.4) and again chromatographed on a column of Amberlite CG-50 (H$^+$ form). The eluate was lyophilized several times. $[\alpha]_D^{25} = -62.8°$ (c = 0.5 in 1 N acetic acid). Paper electrophoresis: Buffer of 2 ml of glacial acetic acid and 20 ml of pyridine made up with water to 1 liter (pH = 6.0): $R_{flur-inine)} = 0.65 \pm 0.05$ Buffer of 37 ml of formic acid and 25 ml of acetic acid made up with water to 1 litre (pH = 1.7): $R_{flarginine)} = 0.46 \pm 0.05$.

EXAMPLE 2 a. Boc-S-benzyl-L-cysteinyl-O-benzyl-L-tyrosine methyl ester

A solution of 3.1 g of Boc-S-benzyl-L-cysteine, 3.2 g of O-benzyl-L-tyrosine methyl ester hydrochloride and 1.23 ml of N-methylmorpholine in 40 ml of dimethylformamide was mixed at 0°C with 2.47 g of dicyclohexylcarbodiimide, stirred for 30 minutes at 0°C and for a further 2 hours at room temperature and stored for 15 hours at 4°C. The precipitate was filtered off, the filtrate concentrated under reduced pressure, the residue dissolved in ethyl acetate and the solution washed three times each with 1 M citric acid, saturated sodium chloride solution, saturated sodium bicarbonate solution and saturated sodium chloride solution, dried and concentrated under reduced pressure. The residue was recrystallized from ethyl acetate/petroleum ether. Yield: 4.3 g; melting point 119°–121°C; $[\alpha]_D^{25} = -11.8°$ (c = 1 in methanol).

b. Z-L-Prolyl-S-benzyl-L-cysteinyl-O-benzyl-L-tyrosine methyl ester.

A solution of 1.2 g of Boc-S-benzyl-L-cysteinyl-O-benzyl-L-tyrosine methyl ester in 20 ml of 1.6 N hydrogen chloride in glacial acetic acid was stirred for 30 minutes at room temperature. The dipeptide ester hydrochloride was precipitated by the addition of ether, filtered and dried over phosphorus pentoxide/potassium hydroxide. This residue was dissolved in 15 ml of dimethylformamide, neutralized by the addition of 0.168 ml of N-methylmorpholine and reacted with 0.55 g of Z-L-Pro-OPhNO$_2$. The mixture was stored for 18 hours at room temperature, the dimethylformamide distilled off under reduced pressure, the residue dissolved in ethyl acetate and the solution washed with approximately 1 percent aqueous triethylamine solution, 1 N hydrochloric acid and saturated sodium chloride solution, dried and concentrated. The residue was recrystallized from ethyl acetate/hexane. Yield: 0.8 g; melting point 150°–151°C; $[\alpha]_D^{25} = -52.5°$ (c = 0.5 methanol).

c. Z-L-Prolyl-S-benzyl-L-cysteinyl-O-benzyl-L-tyrosine hydrazide.

0.5 g of Z-L-prolyl-S-benzyl-L-cysteinyl-O-benzyl-L-tyrosine methyl ester were dissolved with warming in a mixture of 30 ml of methanol and 2.5 ml of dimethylformamide. The solution was mixed with 0.6 ml of hydrazine hydrate, stored for 20 hours at 50°C and for 5 hours at 4°C and the crystallized tripeptide hydrazide was filtered off, washed with ether and dried. Yield: 0.39 g; melting point 196°–197°C; $[\alpha]_D^{25} = -56.6°$ (c = 0.5 in dimethylformamide).

d. Z-L-Leucyl-L-asparaginyl-S-benzyl-L-cysteinyl-L-prolyl-N$^\epsilon$-tosyl-L-lysyl-glycinamide.

14.0 g of Z-L-asparaginyl-S-benzyl-L-cysteinyl-L-prolyl-N$^\epsilon$-tosyl-L-lysyl-glycinamide [prepared according to M. Bodanszky et al. J. Amer. Chem. Soc. 82, 3195 (1960)] were dissolved with warming in 60 ml of glacial acetic acid and mixed at room temperature with 60 ml of a 5 N hydrogen bromide/glacial acetic acid solution. The mixture was stirred for 1 hour at room temperature and subsequently added dropwise into 600 ml of ether. The precipitated hydrobromide of the pentapeptide was washed with ether, dried over potassium hydroxide and phosphorus pentoxide and dissolved in 100 ml of methanol. The solution was passed through a column of Dowex 2 (OH$^-$ form), the eluate concentrated under reduced pressure and the residue dissolved in 60 ml of dimethylformamide. The solution was mixed at 0°C with 6.55 g of Z-Leu-OPhNO₂, the mixture stored for 2 days at room temperature and the protected hexapeptide precipitated by the addition of 600 ml of ethyl acetate, washed with ether and ethyl acetate and dried. Yield: 11.6 g; melting point 223°–225°C; $[\alpha]_D^{25} = -43.9°$ (c = 1.0 in dimethylformamide).

e.

Z-L-Isoleucyl-L-leucyl-L-asparaginyl-S-benzyl-L-cysteinyl-L-prolyl-N$^\epsilon$-tosyl-L-lysyl-glycinamide.

The Z-protecting group was cleaved off from 11.0 g of Z-L-leucyl-L-asparaginyl-S-benzyl-L-cysteinyl-L-prolyl-N$^\epsilon$-tosyl-L-lysyl-glycinamide in the manner described in part (d) and the obtained hexapeptide, unprotected at the terminal amino group, was reacted with 5.0 g of Z-L-Ile-OPhNO₂ in 60 ml of dimethylformamide. The mixture was stored for 3 days at room temperature, the protected heptapeptide precipitated by the addition of 600 ml of ethyl acetate and the precipitate washed with ether and ethyl acetate and dried. Yield: 9.6 g; melting point 224°–227°C; $[\alpha]_D^{25} = -43.3°$ (c = 0.5 in dimethylformamide).

f.

Z-L-Prolyl-S-benzyl-L-cysteinyl-O-benzyl-L-tyrosyl-L-isoleucyl-L-leucyl-L-asparaginyl-S-benzyl-L-cysteinyl-L-prolyl-N$^\epsilon$-tosyl-L-lysyl-glycinamide.

A solution of 0.285 g of Z-L-prolyl-S-benzyl-L-cysteinyl-O-benzyl-L-tyrosine hydrazide in 3 ml of dimethylformamide was mixed at −20°C with 1.5 ml of 1.6 N hydrogen chloride in tetrahydrofuran and 0.15 ml of isoamyl nitrite. The mixture was stirred for 40 minutes at −20°C and mixed at this temperature, after neutralization by means of 0.27 ml of N-methylmorpholine, with a solution of 0.4 g of L-isoleucyl-L-leucyl-L-asparaginyl-S-benzyl-L-cysteinyl-L-prolyl-N$^\epsilon$-tosyl-L-lysyl-glycinamide [obtained by cleavage of the Z-protecting group from Z-L-isoleucyl-L-leucyl-L-asparaginyl-S-benzyl-L-cysteinyl-L-prolyl-N$^\epsilon$-tosyl-L-lysyl-glycinamide in the manner described in part (d)] in 1.5 ml of dimethylformamide. The mixture was stirred for 1 hour at −15°C and stored for 3 days at 4°C. The mixture was then filtered, the protected decapeptide precipitated by the dropwise addition of the filtrate into water, filtered off, redissolved in dimethylformamide, reprecipitated by the dropwise addition of this solution into a mixture of ethyl acetate/ethanol (1:1), filtered off and dried. Yield: 0.4 g; melting point 230°–233°C; $[\alpha]_D^{25} = -52.4°$ (c = 0.5 in dimethylformamide).

g. Pro-[Ile³, Leu⁴]-lysinevasopressin diacetate.

250 mg of Z-L-prolyl-S-benzyl-L-cysteinyl-O-benzyl-L-tyrosyl-L-isoleucyl-L-leucyl-L-asparaginyl-S-benzyl-L-cysteinyl-L-prolyl-N$^\epsilon$-tosyl-L-lysyl-glycinamide were converted into the desired Pro-[Ile³, Leu⁴]-lysinevasopressin diacetate analogously to the method described in part Id. Yield: 92 mg; $[\alpha]_D^{25} = -55.0°$ (c = 1 in 95 percent acetic acid) Paper electrophoresis: Buffer of 2 ml of glacial acetic acid and 20 ml of pyridine made up with water to 1 liter (pH = 6.0): $R_{f(lysine)}$ = 0.61 ± 0.05 Buffer of 37 ml of formic acid and 25 ml of acetic acid made up with water to 1 liter (pH = 1.7): $R_{f(lysine)}$ = 0.41 ± 0.05.

EXAMPLE 3 a.

Z-N$^\epsilon$-Tosyl-L-lysyl-S-benzyl-L-cysteinyl-O-benzyl-L-tyrosine methyl ester.

A solution of 0.77 g of S-benzyl-L-cysteinyl-O-benzyl-L-tyrosine methyl ester hydrochloride (prepared from Boc-S-benzyl-L-cysteinyl-O-benzyl-L-tyrosine methyl ester as described in part 2b), 0.168 ml of N-methylmorpholine and 0.65 g of Z-N$^\epsilon$-tosyl-L-lysine in 15 ml of dimethylformamide was mixed at 0°C with 0.35 g of dicyclohexylcarbodiimide and stored for 15 hours at room temperature. The mixture was filtered, the filtrate concentrated under reduced pressure and the residue dissolved in ethyl acetate. This solution was washed with 1 N hydrochloric acid, saturated sodium chloride solution, saturated sodium bicarbonate solution and saturated sodium chloride solution, dried and concentrated under reduced pressure. The protected tripeptide ester was recrystallized from ethanol. Yield: 0.6 g; melting point 109°–110°C; $[\alpha]_D^{25} = -19.1°$ (c = 0.5 in dimethylformamide).

b.

Z-N$^\epsilon$-Tosyl-L-lysyl-S-benzyl-L-cysteinyl-O-benzyl-L-tyrosine hydrazide.

0.4 g of Z-N$^\epsilon$-tosyl-L-lysyl-S-benzyl-L-cysteinyl-O-benzyl-L-tyrosine methyl ester were dissolved in 15 ml of methanol, mixed with 0.41 ml of hydrazine hydrate and stored for 20 hours at 50°C. Thereupon, the solution was stored for 3 hours at 4°C, the crystallized tripeptide hydrazide filtered off and recrystallized from ethanol. Yield: 0.29 g; melting point 172°–173°C; $[\alpha]_D^{25} = -23.8°$ (c = 0.5 in dimethylformamide).

c

Z-N$^\epsilon$-Tosyl-L-lysyl-S-benzyl-L-cysteinyl-O-benzyl-L-tyrosyl-L-isoleucyl-L-leucyl-L-asparaginyl-S-benzyl-L-cysteinyl-L-prolyl-N$^\epsilon$-tosyl-L-lysyl-glycinamide.

A solution of 0.225 g of Z-N$^\epsilon$-tosyl-L-lysyl-S-benzyl-L-cysteinyl-O-benzyl-L-tyrosine hydrazine in 3 ml of dimethylformamide was mixed at −20°C with 1.0 ml of 1.5 N hydrogen chloride in tetrahydrofuran and 0.1 ml of isoamyl nitrite. The mixture was stirred for 40 minutes at −20°C and mixed at this temperature, after neutralization by means of 0.17 ml of N-methylmorpholine, with a solution of 0.25 g of L-isoleucyl-L-leucyl-L-asparaginyl-S-benzyl-L-cysteinyl-L-prolyl-N$^\epsilon$-tosyl-L-lysyl-glycinamide in 1 ml of dimethylformamide, stirred for 1 hour at −15°C and stored for 5 days at 4°C. The protected decapeptide was precipitated by the dropwise addition of the mixture into water, filtered, and recrystallized from dimethylformamide. Yield: 0.2 g; melting point 229°–231°C; $[\alpha]_D^{25} = -37.6°$ (c = 0.5 in dimethylformamide).

(d) Lys-[Ile³, Leu⁴]-lysinevasopressin triacetate.

160 mg of Z-N$^\epsilon$-tosyl-L-lysyl-S-benzyl-L-cysteinyl-O-benzyl-L-tyrosyl-L-isoleucyl-L-leucyl-L-asparaginyl-S-benzyl-L-cysteinyl-L-prolyl-N$^\epsilon$-tosyl-L-lysyl-glycinamide were converted into Lys-[Ile³, Leu⁴]-lysinevasopressin triacetate analogously to the method described in part Id. Yield: 44 mg; $[\alpha]_D^{25} = -34.7°$ (c = 0.75 in 95 percent acetic acid). Paper electrophoresis:

Buffer of 2 ml of glacial acetic acid and 20 ml of pyridine made up with water to 1 liter (pH = 6.0): $R_{f(lysine)}$ = 0.74 ± 0.05
Buffer of 37 ml of formic acid and 25 ml of acetic acid made up with water to 1 liter (pH = 1.7): $R_{f(lysine)}$ = 0.55 ± 0.05.

EXAMPLE 4 a. Z-γ-t-Butyl-L-glutamyl-S-benzyl-L-cysteine methyl ester.

5.2 g of Z-γ-t-butyl-L-glutamic acid dicyclohexylammonium salt and 2.6 g of S-benzyl-L-cysteine methyl ester hydrochloride were suspended in 100 ml of dimethylformamide and stirred for 30 minutes at room temperature. The mixture was filtered, the filtrate mixed at 0°C with 2.2 g of dicyclohexylcarbodiimide, stirred for 30 minutes at 0°C and stored for 2 days at room temperature. The mixture was then filtered, the filtrate concentrated under reduced pressure and the residue dissolved in ethyl acetate. This solution was washed with 1 M citric acid, saturated sodium chloride solution, saturated sodium bicarbonate solution and saturated sodium chloride solution, dried and concentrated under reduced pressure. The protected dipeptide ester was recrystallized from ethyl acetate/hexane. Yield: 2.6 g; melting point 92°–93°C; $[\alpha]_D^{25} = -43.5°$ (c = 1 in methanol).

b. Z-γ-t-Butyl-L-glutamyl-S-benzyl-L-cysteine hydrazide.

1.5 g of Z-γ-t-butyl-L-glutamyl-S-benzyl-L-cysteine methyl ester were dissolved in 25 ml of ethanol, mixed with 0.5 ml of hydrazine hydrate. The mixture was stored for 2 days at room temperature and for 1 day at 4°C, the dydrazide was filtered off and recrystallized from ethanol/ether. Melting point 154°–155°C; $[\alpha]_D^{25} = -20.4°$ (c = 0.5 in dimethylformamide).

c.
Z-O-Benzyl-L-tyrosyl-L-isoleucyl-L-leucyl-asparaginyl-S-benzyl-L-cysteinyl-L-prolyl-N$^\epsilon$ -tosyl-L-lysyl-glycinamide.

The Z-protecting group was cleaved off from 4.5 g of Z-L-isoleucyl-L-leucyl-L-asparaginyl-S-benzyl-L-cysteinyl-L-prolyl-N$^\epsilon$ -tosyl-L-lysyl-glycinamide in the manner described in part 2d and the obtained heptapeptide, unprotected at the terminal amino group, was reacted with 2.1 g of Z-O-benzyl-L-Tyr-OPhNO$_2$ in 60 ml of dimethylformamide. After standing for 12 hours at room temperature, the mixture was added dropwise into ethanol, the precipitated, protected octapeptide filtered off, washed with ethanol and ether and dried. Yield: 4.2 g; melting point 230°–232°C; $[\alpha]_D^{25} = -18.5°$ (c = 1 in dimethylformamide).

d.
Z-γ-t-Butyl-L-glutamyl-S-benzyl-L-cysteinyl-L-tyrosyl-L-isoleucyl-L-leucyl-L-asparaginyl-S-benzyl-L-cysteinyl-L-prolyl-N$^\epsilon$ -tosyl-L-lysyl-glycinamide.

A solution of 0.38 g of Z-γ-t-butyl-L-glutamyl-S-benzyl-L-cysteine hydrazide in 3 ml of dimethylformamide was mixed at −20°C with 3 ml of 1.4 N hydrogen chloride in tetrahydrofuran and 0.3 ml of isoamyl nitrite. The mixture was stirred for 40 minutes at −20°C and mixed at this temperature, after neutralization with 0.47 ml of N-methylmorpholine, with the solution of the amino component (prepared by dissolving 0.965 g of Z-O-benzyl-L-tyrosyl-L-isoleucyl-L-leucyl-L-asparaginyl-S-benzyl-L-cysteinyl-L-prolyl-N$^\epsilon$ -tosyl-L-lysyl-glycinamide in 15 ml of glacial acetic acid, adding 15 ml of 5 N hydrobromic acid in glacial acetic acid, stirring for 1 hour at room temperature, precipitating the peptide hydrobromide by adding dropwise into ether, washing the precipitate with ether, drying and dissolving in 4 ml of dimethylformamide and finally neutralizing by means of N-methylmorpholine). The mixture was stirred for 1 hour at −15°C, stored for 2 days at 4°C, filtered and the filtrate added dropwise into water. The precipitated, protected decapeptide was filtered off, reprecipitated from dimethylformamide/ethyl acetate, filtered off, digested with boiling ethanol and dried. Yield: 0.56 g; melting point 220°–223°C; $[\alpha]_D^{25} = -38.0°$ (c = 0.5 in dimethylformamide).

e.
Z-L-Glutamyl-S-benzyl-L-cysteinyl-L-tyrosyl-L-isoleucyl-L-leucyl-L-asparaginyl-S-benzyl-L-cysteinyl-L-prolyl-N$^\epsilon$ -tosyl-L-lysyl-glycinamide.

A solution of 0.35 g of Z-γ-t-butyl-L-glutamyl-S-benzyl-L-cysteinyl-L-tyrosyl-L-isoleucyl-L-leucyl-L-asparaginyl-S-benzyl-L-cysteinyl-L-prolyl-N$^\epsilon$ -tosyl-L-lysyl-glycinamide in 5 ml of trifluoroacetic acid was stored for 3.5 hours at room temperature. The partially protected decapeptide acid was precipitated by the dropwise addition of this solution into ether, filtered off and reprecipitated from dimethylformamide/ethyl acetate. Yield: 0.24 g; melting point 218°–220°C.

f. Glu-[Ile$^3$, Leu$^4$]-lysinevasopressin acetate.

190 mg of Z-L-glutamyl-S-benzyl-L-cysteinyl-L-tyrosyl-L-isoleucyl-L-leucyl-L-asparaginyl-S-benzyl-L-cysteinyl-L-prolyl-N$^\epsilon$ -tosyl-L-lysyl-glycinamide were converted, analogously to the method described in part 1d, into Glu-[Ile$^3$, Leu$^4$]-lysinevasopressin acetate which was then chromatographed, in addition to the chromatography on Amberlite CG-50 in a 0.5 M ammonium acetate buffer, on a Sephadex G-10 column in 0.2 N acetic acid. Yield: 30 mg; $[\alpha]_D^{25} = -33.7°$ (c = 1 in 95 percent acetic acid). Paper electrophoresis: Buffer of 2 ml of glacial acetic acid and 20 ml of pyridine made up with water to 1 liter (pH = 6.0): $R_{f(lysine)}$ = 0.38 ± 0.05 Buffer of 37 ml of formic acid and 25 ml of acetic acid made up with water to 1 liter (pH = 1.7): $R_{(lysine)}$ = 0.40 ± 0.05.

EXAMPLE 5 a

Z-L-Leucyl-glycyl-S-benzyl-L-cysteinyl-O-benzyl-L-tyrosine methyl ester

A solution of 1.03 g of S-benzyl-L-cysteinyl-O-benzyl-L-tyrosine methyl ester hydrochloride (prepared as described in part 2b), 0.23 ml of N-methylmorpholine and 0.65 g of Z-L-leucyl-glycine [prepared according to R. Nagata et al., Bull. Chem. Soc. Japan 40, 963 (1967)] in 20 ml of dimethylformamide, was mixed at 0°C with 0.52 g of dicyclohexylcarbodiimide and stirred for 15 hours at room temperature. The mixture was filtered, the filtrate concentrated under reduced pressure and the residue dissolved in ethyl acetate. This solution was washed with 1 N hydrochloric acid, saturated sodium chloride solution, saturated sodium bicarbonate solution and saturated sodium chloride solution, dried and concentrated under reduced pressure. The protected tetrapeptide ester was crystallized from ethyl acetate/hexane. Yield: 1.35 g; melting point 100°–102°C; $[\alpha]_D^{25} = -19.7°$ (c = 0.5 in methanol).

b
Z-L-Leucyl-glycyl-S1Benzyl-L-cysteinyl-O-benzyl-L-tyrosine 0-benzyl-L-tyrosine hydrazide.

1.1 g of Z-L-Leucyl-glycyl-S-benzyl-L-cysteinyl-O-benzyl-L-tyrosine methyl ester were dissolved in 25 ml of methanol and mixed with 0.5 ml of hydrazine hydrate. The mixture was stored for 15 hours at 50°C. The protected tetrapeptide hydrazide was precipitated by the addition of ether, filtered off and recrystallized twice from ethanol. Yield: 0.7 g; melting point 170°–171°C; $[\alpha]_D^{25} = -29.7°$ (c = 0.5 in dimethylformamide).

c.

Z-L-Leucyl-glycyl-S-benzyl-L-cysteinyl-O-benzyl-L-tyrosyl-L-isoleucyl-L-leucyl-L-asparaginyl-S-benzyl-L-cysteinyl-L-prolyl-$N^\epsilon$-tosyl-lysyl-glycinamide A solution of 0.2 g of Z-L-Leucyl-glycyl-S-benzyl-L-cysteinyl-O-benzyl-L-tyrosine hydrazide in 3 ml of dimethylformamide was mixed at −20°C with 1 ml of 1.5 N hydrogen chloride in tetrahydrofuran and 0.1 ml of isoamyl nitrite. The mixture was stirred for 40 minutes at −20°C and mixed at this temperature, after neutralization by means of 0.17 ml of N-methylmorpholine, with a solution of 0.25 g of L-isoleucyl-L-leucyl-L-asparaginyl-S-benzyl-L-cysteinyl-L-prolyl-$N^\epsilon$-tosyl-L-lysyl-glycinamide in 1 ml of dimethylformamide, stirred for 1 hour at −15°C, stored for 3 days at 4°C and filtered. The protected undecapeptide was precipitated by the dropwise addition of the filtrate into water and reprecipitated from dimethylformamide/ethyl acetate. Yield: 0.36 g; melting point 238°–C; C: $[\alpha]_D^{25} = -38.6°$ (c = 0.5 in dimethylformamide).

d. Leu-Gly-[Ile³, Leu⁴]-lysinevasopressin diacetate 250 mg of Z-L-leucyl-glycyl-S-benzyl-L-cysteinyl-0-benzyl-L-tyrosyl-L-isoleucyl-L-leucyl-L-asparaginyl-S-benzyl-L-cysteinyl-L-prolyl-$N^\epsilon$-tosyl-L-lysyl-glycinamide were converted into the Leu-Gly-[Ile³,Leu⁴]-lysinevasopressin diacetate analogously to the method described in part 1d. Yield: 59 mg; $[\alpha]_D^{25} = -43.5°$ (c = 0.75 in 95% acetic acid). Paper electrophoresis:

Buffer of 2 ml of glacial acetic acid and 20 ml of pyridine made up with water to 1 liter (pH = 6.0): $R_{flusine)} = 0.62 \pm 0.05$ Buffer of 37 ml of formic acid and 25 ml of acetic acid made up with water to 1 liter (pH = 1.7): $R_{flusine)} = 0.40 \pm 0.05$.

EXAMPLE 6 a.

Boc-Glycyl-S-benzyl-L-cysteinyl-O-benzyl-L-tyrosine methyl ester

A solution of 0.65 g of S-benzyl-L-cysteinyl-O-benzyl-tyrosine methyl ester hydrochloride, 0.141 ml of N-methylmorpholine and 0.22 g of Boc-glycine in 15 ml of dimethylformamide was mixed at 0°C with 0.27 g of dicyclohexylcarbodiimide, stirred for 3 hours at room temperature and stored for 15 hours at 4°C. The mixture was filtered, the filtrate concentrated under reduced pressure and the residue dissolved in ethyl acetate. This solution was washed with 5 percent potassium bisulphate/10 percent potassium sulphate solution, saturated sodium chloride solution, saturated sodium bicarbonate solution and saturated sodium chloride solution, dried and concentrated under reduced pressure. The protected tripeptide ester was crystallized from ethyl acetate/hexane. Yield: 0.38 g; melting point 114°–115°C; $[\alpha]_D^{25} = -15.9°$ (c = 1 in methanol).

b.

Z-L-Leucyl-glycyl-glycyl-S-benzyl-L-cysteinyl-O-benzyl-tyrosine 0-benzyl-L-tyrosine methyl ester 2.9 g of BOC-glycyl-S-benzyl-L-cysteinyl-O-benzyl-L-tyrosine 0methyl ester were dissolved in 35 ml of 1.5 N hydrochloric acid in glacial acetic acid and stirred for 30 minutes at room temperature. The tripeptide ester hydrochloride was precipitated by the addition of ether, filtered and dried over phosphorus pentoxide/potassium hydroxide. The residue was dissolved in 40 ml of tetrahydrofuran, neutralized by the addition of 0.46 ml of N-methylmorpholine, mixed with 1.32 g of Z-L-leucyl-glycine and mixed at 0°C with 0.93 g of dicyclohexylcarbodiimide. The mixture was stored for 3 days at 4°C, filtered, the filtrate concentrated under reduced pressure and the residue dissolved in ethyl acetate. This solution was washed with 1 N hydrochloric acid, saturated sodium chloride solution, saturated sodium bicarbonate solution and saturated sodium chloride solution, dried and concentrated under reduced pressure. The protected pentapeptide ester was crystallized from ethylacetate/hexane. Yield: 2.9 g; melting point 162°–163°C; $[\alpha]_D^{25} = -22.5°$ (c = 1 in methanol).

c

Z-L-Leucyl-glycyl-glycyl-S-benzyl-L-cysteinyl-O-benzyl-L-tyrosine hydrazide.

2.0 g of Z-L-leucyl-glycyl-glycyl-S-benzyl-L-cysteinyl-O-benzyl-L-tyrosine methyl ester were dissolved in a mixture of 75 ml of ethanol and 10 ml of dimethylformamide, mixed with 1.5 ml of hydrazine hydrate and stored for 16 hours at 50°C. The pentapeptide hydrazide crystallized out after the addition of ether to the mixture, was filtered off and recrystallized from ethyl acetate/hexane and then subsequently from ethanol. Yield: 1.4 g; melting point 196°–197°C; $[\alpha]_D^{25} = -32.0°$ (c = 1 in dimethylformamide).

d.

Z-L-Leucyl-glycyl-glycyl-S-Benzyl-L-cysteinyl-O-benzyl-L-tyrosyl-L-isoleucyl-L-leucyl 0-L-asparaginyl-S-benzyl-L-cysteinyl-L-prolyl-$N^G$-tosyl-L-arginge-glycinamide G A solution of 0.73 g of Z-L-leucyl-glycyl-glycyl-S-benzyl-L-cysteinl-O-bensyl-L-tyrosine hydrazide in 10 ml of dimethylformamide, was mixed at −20°C with 2 ml of 2.7 N hydrogen chloride in tetrahydrofuran and 0.4 ml of isoamyl nitrite. The mixture was stirred for 40 minutes at −20°C and mixed at this temperature, after neutralization by means of 0.605 ml of N-methylmorpholine, with a solution of 0.88 g of L-isoleucyl-L-leucyl-L-asparaginyl-S-benzyl-L-cysteinyl-L-prolyl-$N^G$-tosyl-L-arginyl-glycinamide in 10 ml of dimethylformamide, stirred for 1 hour at −20°C and stored for 4 days at 4°C. The protected dodecapeptide was precipitated by the dropwise addition of the mixture into water, filtered off, dissolved in dimethylformamide and reprecipitated by the dropwise addition into a mixture of ethyl acetate/ethanol (1:1). Yield: 0.93 g; melting point 240°–243°C; $[\alpha]_D^{25} = -36.0°$ (c = 0.5 in dimethylformamide).

e. Leu-Gly-Gly-[Ile³, Leu⁴]-argininevasopressin triacetate 400 mg of Z-L-leucyl-glycyl-glycyl-S-benzyl-L-cysteinyl-0-benzyl-L-tyrosyl-L-isoleucyl-L-leucyl-L-asparaginyl-S-benzyl-L-cysteinyl-L-prolyl-$N^G$-tosyl-L-arginyl-glycinamide were converted into Leu-Gly-Gly-[Ile³, Leu⁴]-argininevasopressin triacetate analogously to the method described in part 1d. Yield: 68 mg; $[\alpha]_D^{25} = -52.5°$ (c = 1 in 95 percent acetic acid). Paper electrophoresis:

Buffer of 2 ml of glacial acetic acid and 20 ml of pyridine made up with water to 1 liter (pH = 6.0): R$_{\text{arginine}}$ = 0.64 ± 0.05 Buffer of 37 ml of formic acid and 25 ml of acetic acid made up with water to 1 liter (pH = 1.7): R$_{\text{arginine}}$ = 0.42 ± 0.05.

EXAMPLE 7 a. Boc-L-Leucyl-glycine ethyl ester

A solution of 4.62 g of Boc-L-leucine in 20 ml of dimethylformamide was mixed at −15°C with 2.24 ml of N-methylmorpholine and 2.64 ml of chloroformic acid isobutyl ester, stirred for 1 minute at this temperature and mixed with a suspension (cooled to −15°C) of 2.8 g of glycine ethyl ester hydrochloride and 2.24 ml of N-methylmorpholine in 25 ml of dimethylformamide. The mixture was stirred for 1 hour at −15°C, for 1 hour at room temperature, concentrated under reduced pressure and the residue dissolved in water. This solution was extracted several times with ethyl acetate. The combined ethyl acetate extracts were washed with 5 percent potassium bisulphate/10 percent potassium sulphate solution, saturated sodium chloride solution, saturated sodium bicarbonate solution and saturated sodium chloride solution, dried and concentrated under reduced pressure. The protected dipeptide ester was crystallized from ethyl acetate/hexane. Yield: 4.9 g; melting point 82°–83°C; $[\alpha]_D^{25} = -29.3°$ (c = 1 in methanol).

b. Boc-L-Leucyl-glycine 4.5 g of Boc-L-leucyl-glycine ethyl ester were dissolved in a mixture of 20 ml of methanol and 20 ml of acetone, mixed with 14 ml of 2 N sodium hydroxide and stirred for 75 minutes at room temperature. The solution was diluted with water, freed from organic solvent under reduced pressure, acidified with a mixture of 5 percent potassium bisulphate solution and 10 percent potassium sulphate solution and extracted with ethyl acetate. The ethyl acetate extracts were dried, concentrated under reduced pressure and the protected dipeptide acid was crystallized from ethyl acetate/hexane. Yield: 3.9 g; melting point 121°–122°C; $[\alpha]_D^{25} = -28.4°$ (c = 1 in methanol).

c. Boc-L-Leucyl-glycyl-glycine ethyl ester

A solution of 3.6 g of Boc-L-leucyl-glycine in 20 ml of dimethylformamide was mixed at −15°C with 1.4 ml of N-methylmorpholine and 1.65 ml of chloroformic acid isobutyl ester, stirred for 1 minute at this temperature and mixed with a suspension (cooled to −15°C) of 1.74 g of glycine ethyl ester hydrochloride and 1.4 ml of N-methylmorpholine in 25 ml of dimethylformamide. The mixture was stirred for 30 minutes at −15°C and for 1 hour at room temperature and concentrated under reduced pressure. The residue was worked up as described in part a. The protected tripeptide ester was obtained as an oil. Yield: 4.5 g.

d. Boc-L-Leucyl-glycyl-glycine 3.5 g of Boc-L-leucyl-glycyl-glycine ethyl ester were saponified analogously to the method described in part b. The protected tripeptide acid was obtained as an oil. Yield: 3.1 g. For characterisation, a sample of the protected tripeptide acid was converted in the usual manner into its dicyclohexylammonium salt. Melting point 165°–166°C; $[\alpha]_D^{25} = -5.9°$ (c = 1 in methanol).

e. Z-O-Benzyl-L-tyrosyl-L-isoleucyl-L-leucyl-L-asparaginyl-S-benzyl-L-cysteinyl-L-prolyl-N$^G$-tosyl-L-arginyl-glycinamide.

The Z-protecting group was cleaved off from 10.0 g of the obtained Z-L-isoleucyl-L-leucyl-L-asparaginyl-S-benzyl-L-cysteinyl-L-prolyl-N$^G$-tosyl-L-arginyl-glycinamide in the manner described in part 1a and the resulting free amine reacted with 4.5 g of Z-O-benzyl-L-Try-OphNP$_2$ in 100 ml of dimethylformamide. After standing for 3 days at room temperature, the protected octapeptide was precipitated by the addition of ethyl acetate, washed with ethyl acetate and ethanol, reprecipitated from glacial acetic acid/ethanol, washed with ethanol and dried. Yield: 8.4 g; melting point 237°–238°C; $[\alpha]_D^{24} = -36.2°$ (c = 0.5 in dimethylformamide).

f. Z-S-Benzyl-L-cysteinyl-L-tyrosyl-L-isoleucyl-L-leucyl-L-asparaginyl-S-benzyl-L-cysteinyl-L-prolyl-N$^G$-tosyl-L-arginyl-glycinamide.

7.0 g of Z-O-benzyl-L-tyrosyl-L-isoleucyl-L-leucyl-L-asparaginyl-S-benzyl-L-cysteinyl-L-propyl-N$^G$-tosyl-L-arginyl-glycinamide were dissolved in 50 ml of glacial acetic acid and mixed with 50 ml of a 5 N hydrogen bromide/glacial acetic acid solution. After stirring for 1 hour, the mixture was added dropwise into 1 liter of ether, the precipitate filtered off, washed with ether, reprecipitated from ethanol/ether and dried over phosphorus pentoxide and potassium hydroxide. The thus obtained hydrobromide of the octapeptide was dissolved in 50 ml of dimethylformamide. The solution was brought to pH 7.5 by the addition of ethyl diisopropylamine and mixed with 2.7 g of Z-S-benzyl-L-Cys-OPhNO$_2$. After standing for 3 days at room temperature, the protected nonapeptide was precipitated by the addition of ethanol, washed with ethyl acetate and ethanol and dried. Yield: 4.7 g; melting point 220°–223°C; $[\alpha]_D^{24} = -42.6°$ (c = 0.5 in dimethylformamide).

g [Ile³, Leu⁴]-argininevasopressin diacetate 500 mg of Z-S-benzyl-L-cysteinyl-L-tyrosyl-L-isoleucyl-L-leucyl-L-asparaginyl-S-benzyl-L-cysteinyl-L-prolyl-N$^G$-tosyl-L-arginyl-glycinamide were converted into [Ile³, Leu⁴]-argininevasopressin diacetate analogously to the method described in part 1d. Yield: 120 mg; $[\alpha]_D^{25} = +4.0°$ (c = 0.5 in 1 N acetic acid). Paper electrophoresis:
Buffer of 2 ml of glacial acetic acid and 20 ml of pyridine made up with water to 1 liter (pH = 6.0): R$_{\text{arginine}}$ = 0.51 ± 0.05
Buffer of 37 ml of formic acid and 25 ml of acetic acid made up with water to 1 liter (pH = 1.7): R$_{\text{arginine}}$ = 0.52 ± 0.05.

h. Leu-Gly-Gly-[Ile³, Leu⁴]-argininevasopressin triacetate

A solution of 345 mg of BOC-L-leueyl-glycyl-glycin in 5 ml of tetrahydrofuran was mixed with 115 mg of N-hydroxysuccinimide and 206 mg of dicyclohexylcarbodiimide, stirred for 2 hours at room temperature and filtered. The filtrate was concentrated under reduced pressure and the thus obtained hydroxysuccinimide ester of the protected tripeptide acid was dried. A solution of 25 mg of [Ile³, Leu⁴]-argininevasopressin diacetate in 0.5 ml of water was mixed with a solution of 31 mg of Boc-L-leucyl-glycyl-glycine hydroxysuccinimide ester in 0.5 ml of dioxane. The mixture was brought to pH 6.75 by the addition of N-methylmorpholine and stored for 2 days at room temperature. The mixture was then brought to pH 2.9 by the addition of 0.1 N hydrochloric acid, filtered, diluted with 10 ml of water and extracted three times with ethyl acetate. The aqueous phase was chromatographed on a Sephadex G-10 column with 0.2 N acetic acid. The column eluate was lyophilised, the lyophilisate dissolved in 4 ml of 90 percent aqueous trifluoroacetic acid, stored for 30 minutes at room temperature, diluted with 150 ml of water, concentrated under reduced pressure, diluted again with 150 ml of water, concentrated again and finally lyophilised. For further purification, the lyophilisate was chromatographed on an Amberlite CG-50 column (H⁺ form) with 0.5 M ammonium acetate buffer (pH 6.4). The eluate was lyophilised several times with intermediate uptake of water. The thus obtained Leu-Gly-Gly-[Ile³, Leu⁴]-argininevasopressin triacetate showed the expected amino acid proportions in an amino acid analysis and wash chromatographically and paper-electrophoretically identical with the material described in part 6e.

EXAMPLE 8

Sublingual tablets containing the following ingredients are prepared according to known procedures:

a) Gly-[Ile³,Leu⁴]-arginine-
   vasopressin-diacetate        5.83 mg
   Lactose                      66.17 mg
   Sugar, powdered              20.00 mg
   Polyvinylpyrrolidone         7.00 mg
   Magnesium stearate           1.00 mg
                                _____
                                100.00 mg b) Gly-[Ile³,Leu⁴]-arginine-
   vasopressin-diacetate        11.66 mg
   Lactose                      71.34 mg
   Mannitol                     60.00 mg
   Hydroxypropyl-
   methylcellulose              5.00 mg
   Magnesiumstearate            2.00 mg
                                _____
                                150.00 mg

EXAMPLE 9

An injection solution containing the following ingredients is prepared according to known procedures:

|  | per ml |
|---|---|
| Leu-Gly-[Ile³,Leu⁴]-lysinevasopressin-diacetate | 0.12 mg |
| NaCl | 9.00 mg |
| HCl 0.1N ad pH 3.5 | q.s. |
| H₂O ad inject. | ad 1 ml |

EXAMPLE 10

A lyophilisate containing the following ingredients is prepared according to known procedures:

|  | Parts by weight |
|---|---|
| Leu-Gly-Gly-[Ile³,Leu⁴]-argininevasopressin-triacetate | 11.60 |
| L-Malic acid | 1.74 |
| D-Mannitol | 150.00 |
|  | 163.34 |

In order to produce an injection solution which is ready for use 163.34 mg of this lyophilisate are dissolved in 10 ml of distilled water.

We claim:
1. A compound of the general formula

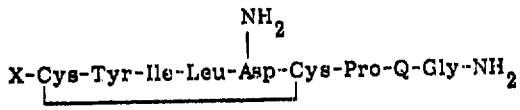

wherein X is the residue of a naturally occurring amino acid or of a linear peptide of 2–6 amino acids selected from leucine and glycine and Q is the residue of arginine or lysine and wherein all amino acids with an asymmetric center have the L-configuration
and pharmaceutically acceptable non-toxic acid addition salts thereof.

2. A compound of claim 1 of the formula

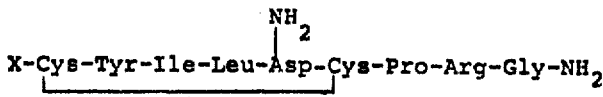

wherein X is the residue of a naturally occurring amino acid or of a linear peptide of 2–6 amino acids selected from leucine and glycine and pharmaceutically acceptable non-toxic acid addition salts thereof.

3. A compound of claim 2 wherein X is the residue of a naturally occurring amino acid 4. The compound of claim 3 which is Gly-[Ile³,Leu⁴]-argininevasopressin diacetate.

5. A compound of claim 1 wherein X is a linear peptide of 2–6 amino acids selected from leucine and glycine.

6. The compound of claim 5 which is Leu-Gly-Gly-[Ile³,Leu⁴]-lysinevasopressin triacetate.

7. A compound of claim 1 of the formula

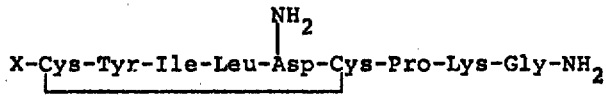

wherein X is the residue of a naturally occuring amino acid
or of a linear peptide of 2–6 amino acids selected from leucine and glycine and pharmaceutically acceptable non-toxic acid addition salts thereof.

8. A compound of claim 7 wherein X is the residue of a naturally occurring amino acid.

9. The compound of claim 8 which is Pro-[Ile³,Leu⁴]-lysinevasopressin diacetate.

10. A compound of claim 8 which is Lys-[Ile³,Leu⁴]-lysinevasopressin diacetate.

11. The compound of claim 8 which is Glu-[Ile³,Leu⁴]-lysinevasopressin acetate.

12. A compound of claim 7 wherein X is a linear peptide of 2–6 amino acids selected from leucine and glycine.

13. The compound of claim 12 which is Leu-Gly-[Ile³,Leu⁴]-lysinevasopressin diacetate.

* * * * *